(12) United States Patent
Mishra et al.

(10) Patent No.: US 11,552,782 B2
(45) Date of Patent: Jan. 10, 2023

(54) SECURING SYSTEM-ON-CHIP (SOC) USING INCREMENTAL CRYPTOGRAPHY

(71) Applicant: University of Florida Research Foundation, Inc., Gainesville, FL (US)

(72) Inventors: Prabhat Kumar Mishra, Gainesville, FL (US); Thelijjagoda S N Charles, Gainesville, FL (US); Yangdi Lyu, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 70 days.

(21) Appl. No.: 16/915,021

(22) Filed: Jun. 29, 2020

(65) Prior Publication Data
US 2021/0021404 A1    Jan. 21, 2021

Related U.S. Application Data

(60) Provisional application No. 62/874,187, filed on Jul. 15, 2019.

(51) Int. Cl.
*H04L 9/06* (2006.01)
*H04L 9/08* (2006.01)
(Continued)

(52) U.S. Cl.
CPC .......... *H04L 9/0618* (2013.01); *G06F 21/606* (2013.01); *H04L 9/0894* (2013.01)

(58) Field of Classification Search
CPC ... H04L 9/0618; H04L 9/0894; H04L 9/0637; H04L 9/0897; H04L 63/0485; G06F 21/606; G06F 21/71
See application file for complete search history.

(56) References Cited

U.S. PATENT DOCUMENTS

2011/0255689 A1* 10/2011 Bolotov ............... H04L 9/0631
380/42
2014/0317407 A1* 10/2014 Minematsu ............ G06F 21/64
713/170
(Continued)

OTHER PUBLICATIONS

Silva et al., "Confidentiality and Authenticity in a Platform Based on Network-on-Chip," 2017 VII Brazilian Symposium on Computing Systems Engineering (SBESC), 2017, pp. 225-230, doi: 10.1109/SBESC.2017.38. (Year: 2017).*
(Continued)

*Primary Examiner* — Fatoumata Traore
*Assistant Examiner* — Hamid Talaminaei
(74) *Attorney, Agent, or Firm* — Thomas | Horstemeyer, LLP

(57) ABSTRACT

Various examples are provided related to software and hardware architectures that enable a lightweight incremental encryption scheme that is implemented on a System-on-chip (SoC) resource such as a network interface. In one example, among others, a method for incremental encryption includes obtaining, by a network interface (NI) of a sender intellectual property (IP) core in a network-on-chip (NoC) based system-on-chip (SoC) architecture, a payload for communication to a receiver intellectual property (IP) core; identifying, by the NI, one or more different blocks between the payload and a payload of a previous packet communicated between the sender IP core and the receiver IP core; and encrypting, by the NI, the one or more different blocks to create encrypted blocks of an encrypted payload.

18 Claims, 10 Drawing Sheets

(51) Int. Cl.
*H04L 9/40* (2022.01)
*G06F 21/60* (2013.01)
*G06F 21/71* (2013.01)

(56) References Cited

U.S. PATENT DOCUMENTS

2016/0301669 A1* 10/2016 Muma ............... H04L 63/0428
2018/0139051 A1* 5/2018 Ghosh .................. H04L 9/3242
2018/0294968 A1* 10/2018 Johnson ............... H04L 9/0637

OTHER PUBLICATIONS

Engels, et al., Ultra-lightweight cryptography for low-cost RFID tags: Hummingbird algorithm and protocal. CARC Tech. Rep., vol. 29, 2009.
M. Bellare et al., "Keying Hash Functions for Message Authentication", Advances in Cryptology—Crypto 96 Proceedings. vol. 1109, 1996.
M. Bellare et al., "Incremental cryptography and application to virus protection," in STOC, 1995, pp. 45-56.
Lebiednik, et al., "Architecting a secure wireless network-on-chip", Special Session Paper, IEEE, Oct. 2018.
Chittamuru., et al., "SWIFTNoC: a reconfigurable silicon-photonic network with multicase-enabled channel sharing for multicore architectures", AMC Journal on Emerging Techologies in Computing Systems, vol. 13, No. 4, Article 58, Jun. 2017.
Diguet, et al., "NOC-centric security of reconfigurable SoC", Proceedings of the First International Symposium of Networks-on-Chip, IEEE, Computer Society, May 2007.
Winter, Johannes, "Trusted computing building blocks for embedded linux-based ARM trustzone platforms", STC'08, Oct. 31, 2008.
Fiorin, et al., "A security monitoring service for NoCs", ISSS'08; Oct. 19-24, 2008.
Garg, et al., "Incremental program obfuscation", Advances in cryptology, Jul. 2017.
Bellare, et al., "Incremental cryptography: The case of hashing and signing", Advances in Cryptology—Crypto 94 proceedings. Lecture notes in Computer Science vol. 839, Jan. 1994.
Sajeesh, et al., "An authenticated encryption based security framework for NoC Architectures", 2011 International Symposium on Electronic System Design, Dec. 2011.
Sepulveda, et al., "Towards protected MPSoC communication for information protection against a malicious NoC", Procedia computer science, Jun. 2017.
Usman, et al., "SIT: a lightweight encryption algorithim for secure internet of things", IJACSA, vol. 8, No. 1, Apr. 2017.
Naru, et al., "A recent review on lightweight cryptography in IoT", I-SMAC Feb. 2017.
Itani, et al., "Energy-efficient incremental integrity for securing storage in mobile cloud computing", ResearchGate, Conference paper, Jan. 2011.
Ancajas, et al., "Fort-NoCs: Mitigating the threat of a compromised NoC", DAC, Jun. 1-5, 2014.
Sepulveda, et al., "Efficient security zones implementation through hierarchical group key management at NoC-based MPSoCs", Microprocessors and Microsystems, Science Direct, Mar. 2017.

* cited by examiner

Algorithm 1 - Decryption process of Counter Mode

*Inputs:* ciphertext to decrypt $C$
*Output:* plaintext corresponding to the ciphertext $M$
Procedure: $\mathcal{D}_K$ 1: for all $q = 1, ..., b$ do
  2:      $r_q \leftarrow E_K(IV \| (q)_d)$
  3:      $m_q \leftarrow r_q \oplus c_q$
  4: $M \leftarrow m_1 \| m_2 \| ... \| m_b$
  5: return $M$

FIG. 3

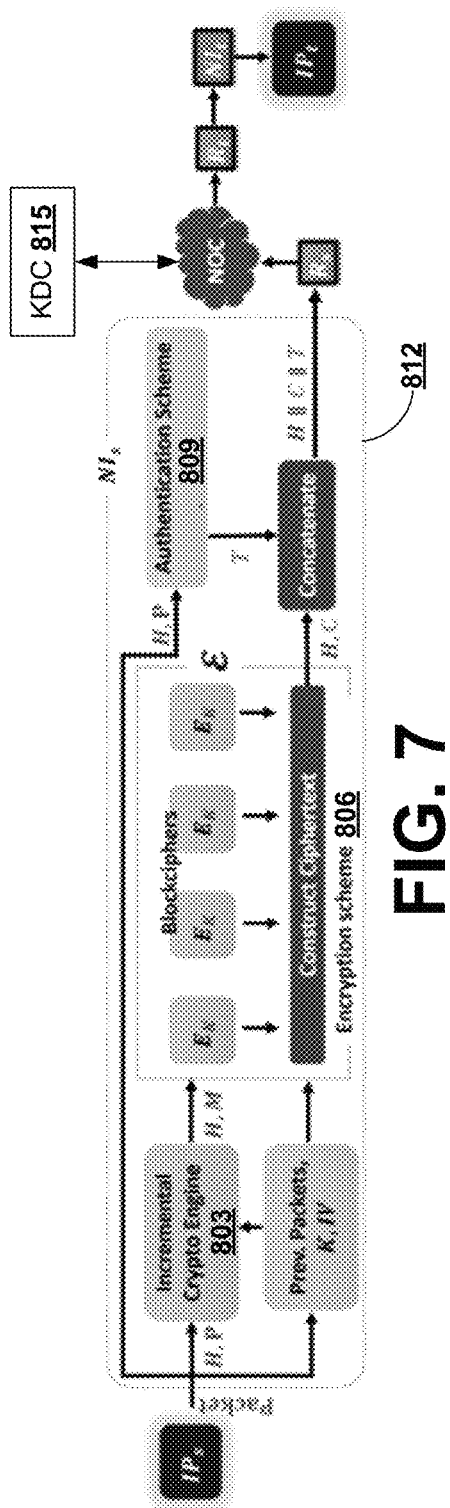

FIG. 7

Algorithm 2 - Encryption and Authentication Process

*Inputs:* current packet $packet_i$, previous payload $P_{i-1}$, key $K$, initialization vector $IV$
*Output:* encrypted packet consisting of header $H_i$, encrypted payload $C_i$ and authentication tag $T_i$
Procedure: *encryptAndAuthenticate*

1: $P_i \leftarrow packet_i.payload$
2: $H_i \leftarrow packet_i.header$
3: $M_i, \delta_i \leftarrow compareBlocks(P_i, P_{i-1})$
4: $C' \leftarrow \mathcal{E}(IV, K, M_i)$
5: $C_i \leftarrow constructCipherText(C', \delta_i)$
6: $T_i \leftarrow generateAuthTag(K, H_i, P_i)$
7: return $H_i \| C_i \| T_i$

FIG. 8

Algorithm 3 - Finding Block-wise Packet Differences

*Inputs:* current payload $P_i$, previous payload $P_{i-1}$
*Output:* different blocks $M_i$, different block indices $\delta_i$
Procedure: *compareBlocks*

1: $bitDiff \leftarrow P_i \oplus P_{i-1}$
2: $B[1], ..., B[k] \leftarrow split(bitDiff, blockSize)$
3: for all $x = 1, ..., size(B)$ do
4:     if $B[x] > 0$ then
5:         $M_i.append(B[x])$
6:         $\delta_i[x] = 1$
7: return $M_i, \delta_i$

FIG. 9A

Algorithm 4 - Encrypt Selected Blocks

*Inputs:* initialization vector $IV$, key $K$, different blocks $M_i$
*Output:* encrypted blocks $C'$
Procedure: $\mathcal{E}$ 1: for all $q = 1, ..., 4$ do
2:     $seq_j \leftarrow getSequenceNumber(P_j)$
3:     $r_q \leftarrow E_K(IV \parallel seq_j \parallel q)$
4:     $C'.append(r_q \oplus M_i[q])$
5: return $C'$

FIG. 9B

Algorithm 5 - Construct the Encrypted Payload

*Inputs:* encrypted blocks $C'$, different block indices $\delta_j$
*Output:* Encrypted payload $C_j$
Procedure: *constructCipherText*

1: for all $x = 1, ..., size(\delta)$ do
2:     if $\delta_j[x] > 0$ then
3:         $C_j.append(C'[x])$
4:     else
5:         $C_j.append(\{0\}_n)$
6: return $C_j$

FIG. 9C

Algorithm 6 - Authentication Tag Generation Process

*Inputs:* key $K$, header $H_i$, payload $P_i$
*Output:* authentication tag $T_i$
Procedure: *generateAuthTag*
 1: $ipad = 0x36 * 4$
 2: $opad = 0x5C * 4$
 3: $K_H = HASHF(K)$
 4: $M = H_i \| P_i$
 5: $TMP = HASHF(K_H \oplus ipad \| M) \oplus IV$
 6: $T_i = HASHF(K_H \oplus opad \| TMP) \oplus IV$
 7: return $T_i$

FIG. 9D

SECURING SYSTEM-ON-CHIP (SOC) USING INCREMENTAL CRYPTOGRAPHY

CROSS REFERENCE TO RELATED APPLICATIONS

This application claims priority to, and the benefit of, co-pending U.S. provisional application entitled "SECURING SYSTEM-ON-CHIP (SoC) USING INCREMENTAL CRYPTOGRAPHY" having Ser. No. 62/874,187, filed Jul. 15, 2019, which is hereby incorporated by reference in its entirety.

STATEMENT REGARDING FEDERALLY SPONSORED RESEARCH OR DEVELOPMENT

This invention was made with government support under 1526687 awarded by the National Science Foundation. The government has certain rights in the invention.

BACKGROUND

Network-on-chip (NoC) has become a standard communication fabric for on-chip components in modern System-on-chip (SoC) designs. Since NoC has visibility to all communications in the SoC, it has been one of the primary targets for security attacks. While packet encryption can provide secure communication, it can introduce unacceptable energy and performance overhead due to the resource-constrained nature of SoC designs.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3 illustrates an example of a decryption process, in accordance with various embodiments of the present disclosure.

FIG. 7 illustrates an example for securing network-on-chip communication, in accordance with various embodiments of the present disclosure.

FIG. 8 illustrates an example of an encryption and authentication process, in accordance with various embodiments of the present disclosure.

FIGS. 9A-9D illustrate example processes for securing network-on-chip communication, in accordance with various embodiments of the present disclosure

DETAILED DESCRIPTION

Figure 1:
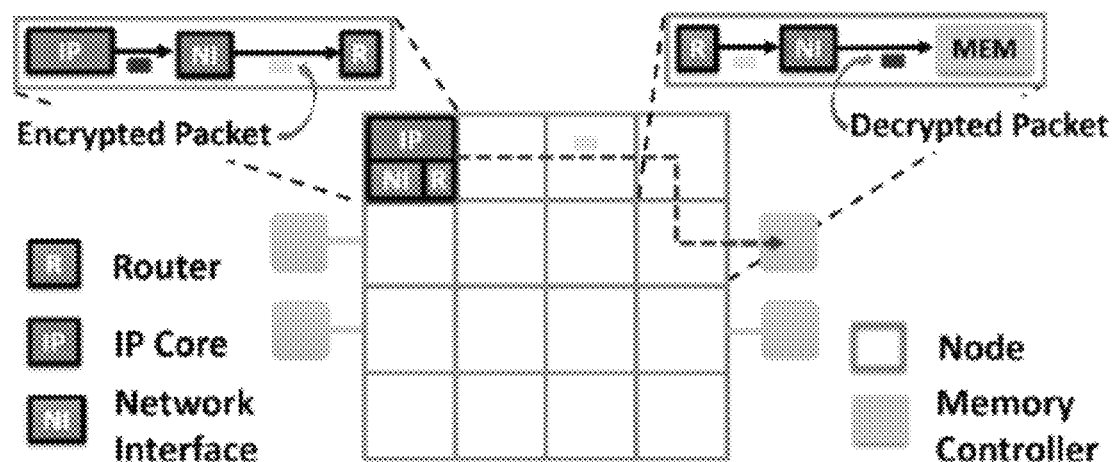
FIG. 1 illustrates an example of a Network-on-Chip (NoC) based multi-core System-on-chip (SoC) architecture, in accordance with various embodiments of the present disclosure.

Disclosed herein are various examples related to software and hardware architectures that enable a lightweight incremental encryption scheme that is implemented on a System-on-chip (SoC) resource such as a network interface. The disclosed approach can improve the performance of encryption and provide enhanced security through various examples that use incremental cryptography and exploit Network-on-Chip (NoC) traffic characteristics. Experimental results demonstrate the approach can reduce (e.g., up to 57%, 30% on average) the encryption time compared to traditional approaches with negligible (e.g., less than 2%) impact on area overhead. Reference will now be made in detail to the description of the embodiments as illustrated in the drawings, wherein like reference numbers indicate like parts throughout the several views.

With the growing demand for high-performance and low-power designs, multi-core architectures are widely used in general purpose chip multiprocessors as well as special purpose SoC designs. Significant performance improvement of multi-core architectures cannot be fully achieved by parallelizing the applications unless an efficient interconnect is used to connect heterogeneous components on the chip. Network-on-chip (NoC) has become a standard interconnect solution. Due to increasing SoC complexity, it is crucial to develop efficient NoC fabrics. The importance of the information passing through the NoC has made it one of the focal points of security attacks. Diguet et al. ("NOC-centric security of reconfigurable SoC," in NOCS, 2007, pp. 223-232) have classified the major NoC security vulnerabilities as denial of service attack, extraction of secret information, and hijacking. Typically, SoCs contain several assets (e.g., logic, data, encryption and authentication keys, random numbers, or configuration keys) that reside in different Intellectual Property (IP) cores or blocks. Protecting communications between IPs, which involve asset propagation, is a major challenge and can involve additional hardware implementing security such as on-chip encryption and authentication units. However, implementation of security features can introduce area, power and performance overhead. Security engineers can consider these nonfunctional and real-time constraints while designing secure architectures to address various threats. An overview of a threat model is as follows:

Threat Model: FIG. 1 shows a NoC-based many-core architecture which encrypts packets transferred or transmitted between IPs. When packets are sent through the NoC, a router infected by a hardware Trojan can copy or re-route packets and send to a malicious IP sitting on the same NoC to leak sensitive information. Therefore, the disclosed model assumes that some of the IPs, as well as the routers, can be malicious. The IPs that can be trusted to be non-malicious are referred to as secure IPs. The goal is to ensure secure communication between these secure IPs. The present disclosure can assume that NIs that connect IPs with routers are secure. This assumption is valid since the NIs are used to integrate components of an SoC and are typically built in house. FIG. 1 shows a NoC based many-core architecture connecting IPs on a single SoC using a 4×4 Mesh topology. Each node contains an IP that connects to a router via a network interface. Communication between two IPs (in this case, a processor IP and a memory controller) is encrypted so that an eavesdropper cannot extract the packet content.

Prior research on security architectures have explored trust-zones, lightweight encryption, DoS attack detection, side channel analysis, etc. However, none of the existing approaches have leveraged the traffic characteristics of an NoC to design a lightweight security architecture. Incremental encryption can be utilized to encrypt packets in a NoC. The disclosed approach takes advantage of the characteristics of NoC traffic, and as a result, it has the ability to construct "lighter-weight" encryption scheme without compromising security. Incremental cryptography has been previously explored in areas such as software virus protection and code obfuscation, respectively by M. Bellare et al. in "Incremental cryptography and application to virus protection" (Proceedings of the 27th ACM Symposium on the Theory of Computing, STOC, pp. 45-56, May 1995), and S. Garg et al. in "Incremental program obfuscation" (in Advanced in Cryptology—CRYPTO 2017—37th Annual International Cryptology Conference, Santa Barbara Calif., USA, Aug. 20-24, 2017, Proceedings, Part II (J. Katz and H. Shacham, eds.), vol. 10402 of Lecture Notes in Computer Science, pp. 193-223, Springer, 2017), which are hereby incorporated by reference in their entireties. The present disclosure describes the use of incremental encryption to implement a lightweight and secure NoC architecture. A goal of the disclosed approach is to design cryptographic algorithms that can use incremental encryption and reduce the effort of encryption/decryption in the NoC environment. The disclosed approach can reuse previously encrypted/decrypted memory fetch requests/responses rather than re-computing them from the scratch. In the disclosed framework, data can be encrypted at a resource of the SoC, such as the network interface (NI) of each secure IP core. The NI can be chosen to accommodate the encryption framework so that each packet can be secured before injecting into the NoC.

Prior research on NoC security have proposed other architectures where the security framework was implemented at the NI, including by J. Sepúlveda et al. in "Towards Protected MPSoC Communication for Information Protection against a Malicious NoC" (Procedia computer science, vol. 108, 2017), and L. Fiorin et al. in "A security monitoring service for NoCs" (CODES+ISSS, 2008, which are hereby incorporated by reference in their entireties. The present disclosure describes the use of incremental encryption to implement a lightweight and secure NoC architecture. It is shown that in an SoC environment, consecutive NoC packets that contain memory fetch requests/responses can differ by only a few bits while communicating between IP cores and memory controllers in the SoC. The present disclosure describes a lightweight encryption scheme (also referred to as an "encryption/decryption scheme") based on incremental cryptography that exploits NoC traffic characteristics. The disclosed security framework is resilient against existing NoC attacks. Experimental results demonstrate that the disclosed approach can significantly improve the overall performance compared to traditional NoC encryption techniques. Below, a brief overview of concepts is provided. Related research efforts are also presented that further highlight technical problems solved by the disclosed approach.

Symmetric Encryption Schemes. A symmetric encryption scheme $S=(\mathcal{K}, E, \mathcal{D})$ can include three algorithms defined as follows:

The key generation algorithm is written as $K \leftarrow \mathcal{K}$. This denotes the execution of the randomized key generation algorithm $\mathcal{K}$ and storing the return string as K where $\beta$ is the length of the key.

The encryption algorithm $\varepsilon$ produces the ciphertext $C \in \{0, 1\}^l$ by taking the key K and a plaintext $M \in \{0, 1\}^l$ as inputs, where l is the length of the plaintext. This is denoted by $C \leftarrow E_K(M)$.

Similarly, the decryption algorithm D denoted by $M \leftarrow \mathcal{D}_K(C)$, takes a key K and a ciphertext $C \in \{0, 1\}^l$ and returns the corresponding $M \in \{0, 1\}^l$.

Block Ciphers. A block cipher typically acts as the fundamental building block of the encryption algorithm ($\varepsilon$). Formally, it is a function (E) that takes a $\beta$-bit key (K) and an n-bit plaintext (m) and outputs an n-bit long ciphertext (c). The values of $\beta$ and n depend on the design and are fixed for a given block cipher. For every $c \in \{0, 1\}^n$, there is exactly one $m \in \{0, 1\}^n$ such that $E_K(m)=c$. Accordingly, $\varepsilon_K$ has an inverse block cipher denoted by $\varepsilon_K^{-1}$ such that $\varepsilon_K^{-1}(E_K(m))=m$ and $E_K(E_K^{-1}(c))=c$ for all m, $c \in \{0, 1\}^n$.

Figure 2:
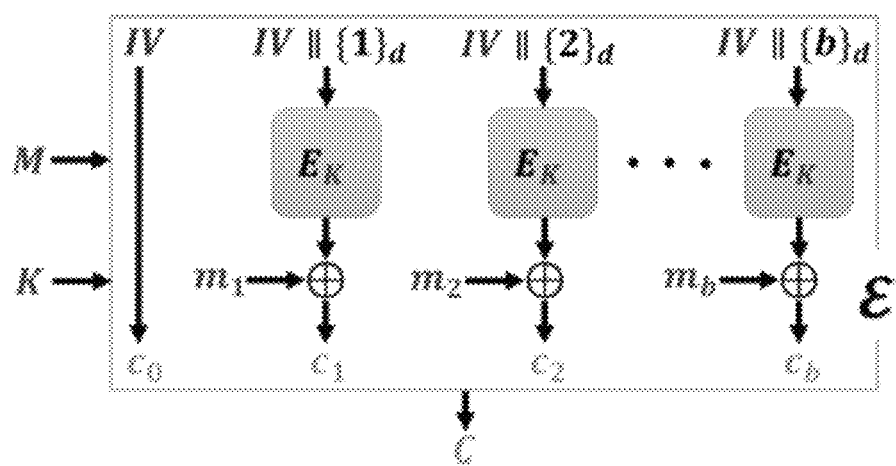
FIG. 2 illustrates an example of a block cipher-based encryption scheme using counter mode, in accordance with various embodiments of the present disclosure.

FIG. 2 shows a block cipher-based encryption scheme using counter mode. Each block cipher ($\varepsilon_K$) encrypts an n-bit block ($m_q$) and b block ciphers together encrypt the entire message M and outputs ciphertext C. This constructs $\varepsilon$ of the encryption scheme S.

When using block ciphers to encrypt long messages, the plaintext (M) of a given length l is divided into b substrings ($m_q$) where each substring is n(=l/b) bits long and n is called the block size. Block ciphers are used in operation modes where one or more block ciphers work together to encrypt n-bit blocks and concatenate the outputs at the end to create the ciphertext of l bits. FIG. 2 shows the counter mode (CM) which is a popular operation mode. CM also uses an initialization vector (IV) which is concatenated with a d-bit value counter (e.g., if d=4, $\{1\}_d$=0001) before inputting to the block cipher. This is done to create domain separation by giving per message and per block variability. FIG. 3 provides an example of an algorithm for a decryption process. The decryption process shown in FIG. 3 can be the inverse of the encryption scheme shown in FIG. 2.

Incremental Cryptography Overview. Consider a scenario that involves encrypting sensitive files or documents. Once a file is encrypted initially, there may be minor changes in the original file. In such a scenario, if conventional encryption is used, the previous encrypted file will be discarded and a new encryption will be performed on the modified file. However, since it is usually the case that these modifications are very small in comparison to the size of the file, encrypting the entire file again is clearly inefficient. Incremental encryption can give significant advantages in such a setup. Two other, similar, scenarios include updating an obfuscated code to accommodate patches and video transmission of images when there are minor changes between frames. Incremental encryption allows to find the cryptographic transformation of a modified input not from scratch, but as a function of the encrypted version of the input from which the modified input was derived. When the changes are small, the incremental method gives considerable improvements in efficiency.

Adhering to the tight power budgets and cost constraints, industrial and academic researchers are coming up with lightweight security primitives specific for domains such as NoC-based SoCs, RFID communication, and Internet of things (IoT). Lightweight security architectures for NoC-based SoCs were proposed in K. Sajeesh and H. K. Kapoor in "An authenticated encryption based security framework for NoC architectures" (ISED, 2011, pp. 134-139), and J. Sepúlveda et al. in "Towards Protected MPSoC Communication for Information Protection against a Malicious NoC" (Procedia computer science, vol. 108, 2017). These methods try to eliminate complex encryption schemes such as AES and replace them with lightweight encryption schemes. However, these methods encrypt each block in a packet which leads to significant performance penalty. Intel introduced TinyCrypt—a cryptographic library with a small footprint which is built for constrained embedded and IoT devices. Several researchers have proposed other lightweight encryption solutions in the IoT domain. Exploiting the unique characteristics of RFID communication, a low-cost encryption algorithm and a protocol described as the Hummingbird-2 algorithm and protocol has been proposed by D. Engels et al. Additional details are provided in "The Hummingbird-2 Lightweight Authenticated Encryption Algorithm" (In: Juels A., Paar C. (eds) RFID. Security and Privacy. RFIDSec 2011. Lecture Notes in Computer Science, vol 7055. Springer, Berlin, Heidelberg), which is hereby incorporated by reference in its entirety. None of these security architectures exploit or sufficiently address the unique communication characteristics in NoC-based SoCs. The disclosed approach utilizes incremental encryption to create a lightweight NoC security framework that can minimize performance overhead with minor impact on area and power.

M. Bellare et al. in "Incremental cryptography and application to virus protection" used incremental encryption to encrypt files/documents undergoing minor changes. Rather than encrypting every file from scratch after each change, they proposed to encrypt only the change(s) and send it together with the previous encryption such that the encryption of the modified version can be constructed. There are fundamental challenges to incorporate incremental cryptography in encrypting packets in the NoC. In the file setting, when a file undergoes some number of modifications, every previous modification becomes redundant. In other words, intermediate steps lose their value as long as the latest version is available. However, intermediate data can be important when encrypting packets in an NoC. Approaches that drop certain packets and encrypt after some modifications would be less desirable, because each packet can be important for the correct functionality of the SoC. Ideas from incremental cryptography have been adopted in other areas such as hashing and signing, program obfuscation, and cloud computing. The disclosure herein provides a technique that can use incremental encryption in the domain of NoC and be able to increase the efficiency and performance of secure NoCs.

The IPs can use the capabilities given by the NoC to communicate with each other and to request/store data from/in memory. The packets injected into the network can be classified as (1) control packets and (2) data packets. For example, a cache miss at an IP will cause a control packet to be injected into the network requesting for that data from the memory. The memory controller, upon receiving the request will reply back with a data packet containing the cache block corresponding to the requested address. The NI (as shown in FIG. 1) can divide a packet into flits (fliticization) before injecting into the network. Flits are the basic building blocks of information transfer between routers. Sensitive data of each flit is encrypted by the NI and injected into the network through the local router. The encryption process of a packet consumes time as each block has to be encrypted and concatenated to create the encrypted packet. Depending on the parameters used for the block cipher (e.g., block size, key size, number of encryption rounds, etc.), the time complexity of the process differs. If each individual packet is encrypted independently, it takes z×T time to encrypt all of them, where z is the number of packets and T is the average time needed to encrypt one packet.

Figure 4A:
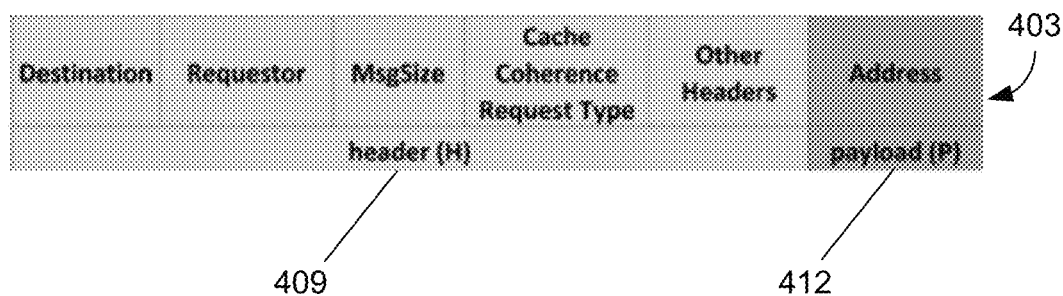
FIGS. 4A and 4B illustrate examples of packet formats for securing network-on-chip communication, in accordance with various embodiments of the present disclosure.
Figure 4B:
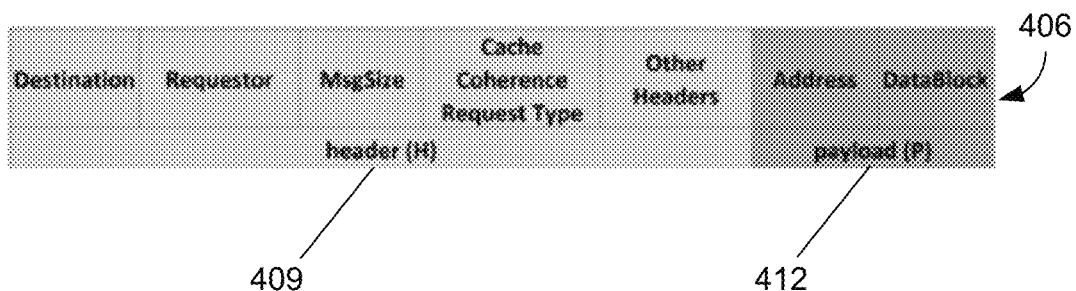

Referring now to FIGS. 4A and 4B, shown are examples of packet formats for a control packet 403 and a data packet 406. The fields in the control packet 403 and the data packet 406 are shown. Header 409 (H) information can be sent as plaintext. Payload 412 (P) or a portion of the payload 412 (P) can contain sensitive data which is encrypted (or to be encrypted). While like numerals such as the payload 412 are used to designate an payload of the control packet 403 and the data packet 406, the respective header and payload of the control packet 403 and the data packet 406 can include different fields or information to be communicated. For example, the payload 412 of the data packet 406 is depicted in FIG. 4B as comprising an Address and a DataBlock. In some embodiments, the packet formats for the control packet 403 and/or the data packet 406 can include an authentication tag 415 (T). The authentication tag 415 (T) can be sent as plaintext.

As discussed above, the idea of incremental encryption is to develop a scheme where the time taken to encrypt an incoming packet can be independent from the packet size. The time taken to encrypt can depend on an amount or number of modifications to the incoming packet (e.g., modifications compared to a previous or most recent packet). To explore how to leverage this idea in the context of NoC, the number of bit changes between consecutive packets generated by a particular IP was profiled.

Figure 5:
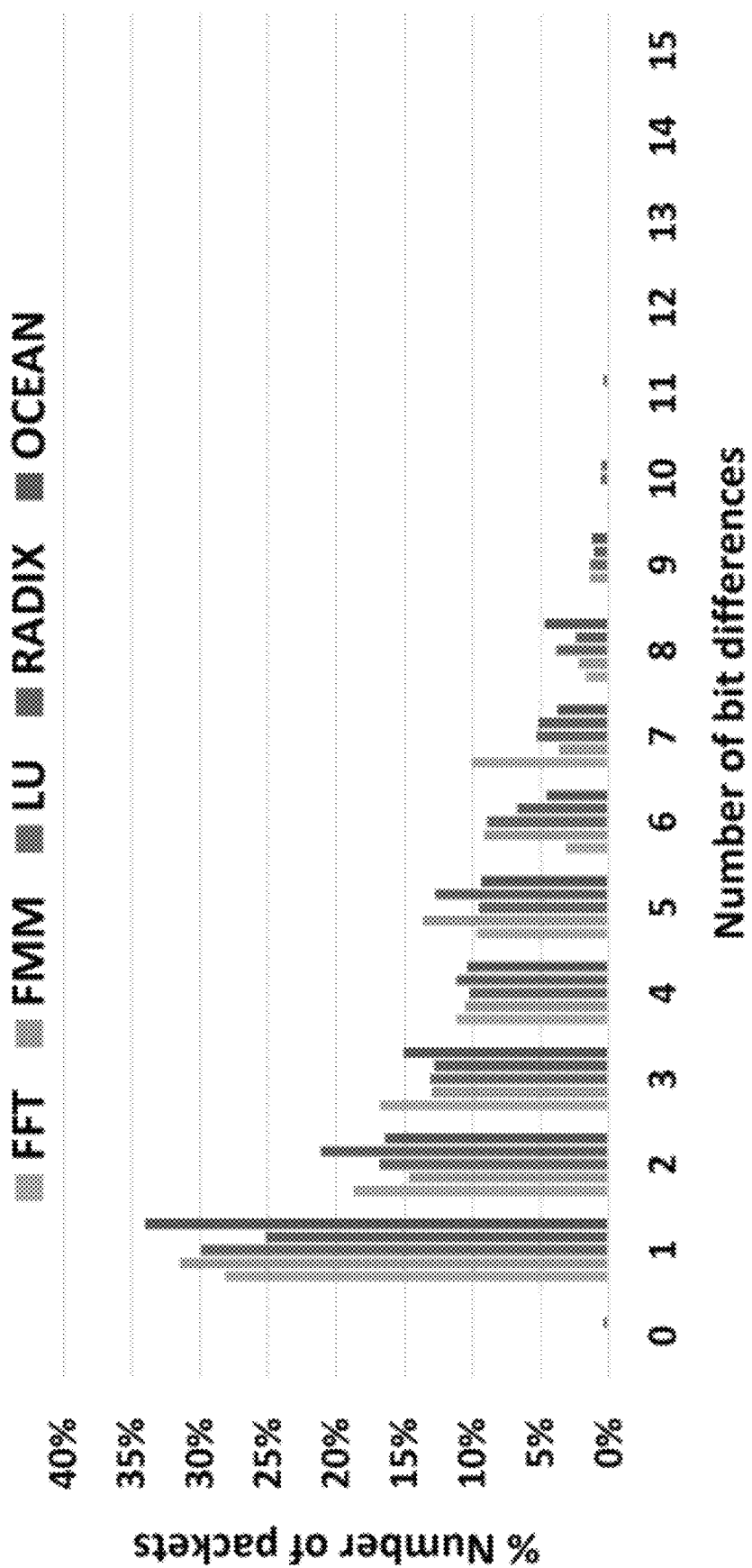
FIG. 5 illustrates an example of bit differences between consecutive memory fetch requests in SPLASH-2 benchmarks, in accordance with various embodiments of the present disclosure.

FIG. 5 shows the number of bit differences as a percentage of memory fetch requests (e.g., control packets 403) when running five benchmarks (FFT, FMM, LU, RADIX, OCEAN) from the SPLASH-2 benchmark suite of the gem5 full-system simulator described by N. Binkert et al. in "The gem5 simulator." FIG. 5 depicts a particular number of bit differences for each one of five benchmarks, with the benchmarks arranged from left to right as FFT, FMM, LU, RADIX, and OCEAN. More details about the experimental setup is given in a section below. Out of the 64 bits of data to be encrypted, the maximum number of bit difference between consecutive packets was 13 bits in the five benchmarks. On average, 30% of the packets differed by only one bit, which can be expected when an application running on a core accesses memory locations within the same memory page (e.g., locations within the same memory page which differ by only a few bits).

Since encryption can be done in blocks, the disclosed approach profiled this data assuming a block size of 16 bits. In this case, up to 16 consecutive bit differences can be considered for each block, and the maximum number of blocks for 64 bits of secure data is 4. The results showed that on average, 80% of the packets differ by only one block and the other 20% differ by two blocks for the benchmarks used. Similar to memory fetch requests, the disclosed approach profiled the response memory data packets as well. Since the response can contain a whole cache block consisting of data modified by calculations, the results show there may not be a comparable optimization opportunity for the response packets as the opportunity shown by memory fetch requests. However, the results show that 15% of consecutive packets are identical. These observations show that the encryption process can be significantly optimized using incremental encryption.

Incremental Encryption

Figure 6:
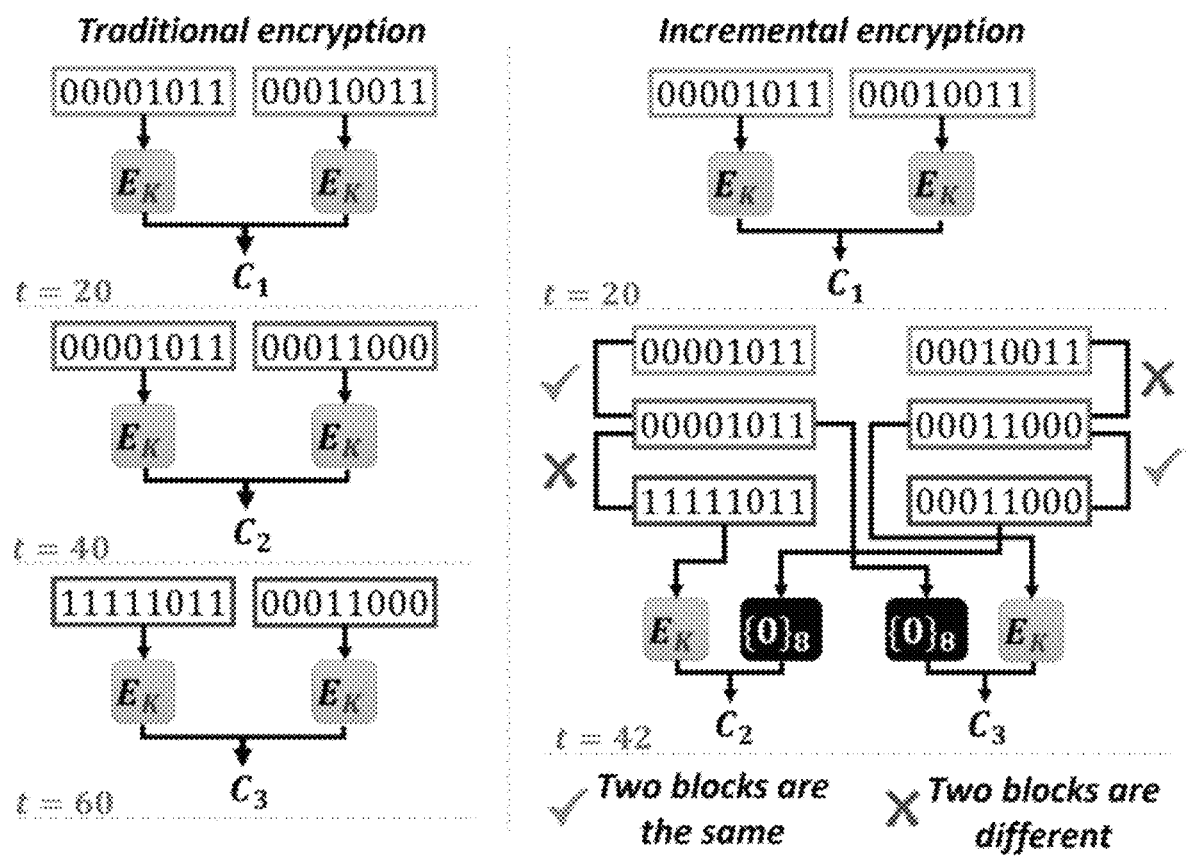
FIG. 6 illustrates an example of using incremental encryption, in accordance with various embodiments of the present disclosure.

Illustrative Example: Referring now to FIG. 6, shown is an illustrative example of how incremental encryption can improve the performance of an NoC. The example of FIG. 6 assumes that encryption takes 20 cycles for each block cipher, and comparing two bit strings to identify different blocks take 1 cycle each. The disclosed approach demonstrates the merit of exploiting unique traffic characteristics using incremental encryption with an illustrative example. FIG. 6 shows the encryption process of three consecutive NoC packets (each with 16 bits) using two methods (i) traditional encryption, (ii) incremental encryption. In traditional encryption, both packets are encrypted sequentially using the two 8-bit block ciphers. In incremental encryption, each packet is compared with the previous packet and only the different blocks are encrypted (e.g., individual ones of the one or more different blocks can be encrypted). Identical blocks can be filled with a filler (e.g., zeros) and header bits are added to indicate the changed blocks. The decryption process uses previously received packets and header information to reconstruct the new packets. In some examples such as where there is no prior packet for comparison, the first packet can be fully encrypted. The illustrative example of FIG. 6 shows a speedup of 1.43 times for incremental encryption compared to traditional encryption. When many packets are encrypted, the time spent to encrypt the first packet becomes negligible and as a result, a significant performance improvement can be observed as shown by the experimental results described below.

Overview. Referring now to FIG. 7, show is an overview of the disclosed NoC security framework. It can include an incremental crypto engine 803 and an encryption scheme 806 which includes the block ciphers ($E_K$). A packet sent from an IP core (e.g., the sender IP core $IP_s$) can have a packet header (H) which can be sent as plaintext across a network (e.g., a network of the NoC), and a payload (P), where at least a portion of the payload (P) can be encrypted before sending to the network. In an embodiment, the header and the portion of the payload (P) can be sent to the incremental crypto engine 803 to start or initiate the incremental encryption process. In an embodiment, the header and payload (P) (or the header and a portion of the payload) are sent to the authentication scheme 809 and the incremental crypto engine 803 to do the encryption and authentication tag calculation in parallel. The disclosed approach can consider the payload (P) to be divided into b blocks of any suitable block size (e.g., 16-bit blocks). For example, a 64-bit payload (l=64) of a control packet 403 (FIG. 4) can contain four 16-bit blocks (b=4) numbered 1 through 4 starting from the least significant byte. The encryption scheme 806 can use block ciphers arranged in counter mode. A detailed explanation of parameters used in the disclosed approach is given in a section below.

The overview of the disclosed security framework, as depicted in FIG. 7, shows that a packet sent from a source IP (e.g., sender IP core $IP_s$) goes through the encryption processes which is implemented in a resource associated with the sender core. For example, the network interface ($NI_s$) 812 can perform the incremental encryption before injecting or transmitting a concatenated result or other data into the NoC to traverse the NoC. A resource associated with a receiver (or target) IP ($IP_t$) does the decryption before forwarding the packet to the target $IP_t$. In an example, the network interface $NI_t$ (FIG. 7) associated with the receiver IP core is the resource that performs the decryption.

Referring now to FIG. 8, shown is an example of the disclosed incremental encryption process. When a packet is sent from an IP core, the incremental crypto engine 803 (FIG. 7) can identify which blocks are different compared to the previous packet (e.g., line 3 of FIG. 8). This can be done by comparing with the previous packet payload ($P_{i-1}$) which can be stored in a register inside the NI 812. In the disclosed approach, one packet for each of the two different packet types (e.g., control packet 403 and a data packet 406) can be stored in a register of the NI 812. Similarly, the receiver's side can also store the most recent packet for each packet type. In addition to that, the key (K) and initialization vector (IV) for the encryption scheme 806 can be stored by the sender and/or receiver IPs. Once block differences are computed, it is then sent to the encryption scheme 806 which encrypts the different blocks (e.g., line 4 of FIG. 8). The final ciphertext is derived from the encrypted blocks and block comparison results (e.g., line 5 of FIG. 8). Additional helper data can also be provided in this step to aid in the decryption (e.g., bits can be computed and inserted into a header to indicate the changed blocks). The authentication scheme 809 (FIG. 8) can generate a tag (e.g., line 6 of FIG. 8), including by generating the tag in parallel with the encryption process. The header and encrypted payload (or ciphertext) can be concatenated to create the final packet and injected into the network (e.g., line 7 of FIG. 8). In some embodiments, the header, encrypted payload (or ciphertext), and tag can be concatenated to create the final packet and injected into the network. At the destination node $NI_t$ (FIG. 7), the inverse process can take place. The destination node also stores the previous packet for each packet type, and therefore, can construct the next packet using the stored packet and the incoming packet data. Since the disclosed approach can store at least one of the previous or most recent packets in one or more registers, the approach does not have to encrypt or decrypt the full packet. In the disclosed approach, a sender can send the changed blocks and the receiver replaces the changed blocks with its modifications to construct the new packet.

The following sections elaborate on the components of the disclosed NoC security framework. Explanations of the compareBlocks function that is implemented in the incremental crypto engine 803 are provided. The disclosed encryption scheme 806 (E) and constructCipherText function in the algorithm of FIG. 9B and the algorithm of FIG. 9C, respectively are presented. The disclosed authentication scheme 809 and generateAuthTag of FIG. 9D are also presented.

Incremental Crypto Engine. The operation of the incremental crypto engine 803 (FIG. 7) is outlined in the algorithm of FIG. 9A. The payload ($P_i$) sent from the IP core is compared with the previous payload of that type ($P_{i-1}$) to identify the blocks that are different ($M_i$). This can be implemented with a simple XOR operation in hardware (line 1 of FIG. 9A). Once the bitwise differences are obtained, the disclosed approach can split the payload into blocks (line 2 of FIG. 9A) to see which blocks are different (e.g., lines 3-6 of FIG. 9A). The different blocks can be sent for encryption. The incremental crypto engine 803 can send the different block numbers ($\delta_i$) to build the ciphertext, and to set the header bits indicating the different blocks to be used by the decryption algorithm.

Encryption Scheme. The disclosed encryption scheme 806 can implement the counter mode (FIG. 2) for encryption which uses an initialization vector (IV), a key and the message to be encrypted as inputs and produces the ciphertext. The $IV\|\{q\}_d$ string, which can be the standard format of the input nonce to counter mode, can be used to give per message and per block variability. It can be calculated using the sequence number of the packet (let $seq_j$ be the sequence number of packet $P_j$), a counter, and the IV as IV||$seq_j$||q to identify different blocks. In some examples, the IV is 64 bits long. The block cipher ID ($q \in \{1,2,3,4\}$) changes with each block cipher and the sequence number $seq_j$ varies from packet to packet. As discussed above, performance improvement can be gained by encrypting multiple blocks in parallel. For example, if two consecutive control packets have differences in two blocks each, twice the speedup can be achieved by encrypting both at the same time compared to the traditional (e.g., non-incremental) approach where all four block ciphers will be used to encrypt each packet. The algorithm of FIG. 9B shows the major steps of the encryption scheme 806 (FIG. 7).

C' can be stored in a buffer. The final ciphertext can be constructed using $\delta_i$ and C' as shown in the algorithm of FIG. 9C. The algorithm of FIG. 9C can take the encrypted value from the buffer for the changed blocks (e.g., lines 2-3 of FIG. 9C) and append n (block size) zeros to identical blocks compared to the previous packet (e.g., lines 4-5 of FIG. 9C). One benefit of this approach is to allow the construction of the same packet size, and as a result, functionality from fliticization to NoC traversal can remain the same.

Initialization and Parameter Refresh. The disclosed approach can benefit from addressing the generation and management of keys and nonces, such as those described by B. Lebiednik et al. in "Architecting a secure wireless network-on-chip" (NOCS, 2018) and J. Sepúlveda et al. in "Efficient security zones implementation through hierarchical group key management at noc-based mpsocs" (Microprocessors and Microsystems, 2017), which are hereby incorporated by reference in their entireties. For example, the keys for communication between the cores can be generated by a key distribution center (KDC), e.g, KDC 815 as depicted in FIG. 7. The KDC 815 can be a specialized IP in the SoC. The KDC 815 can perform various functions for the disclosed security scheme including generating the IVs. The KDC 815 can be connected to the NoC (FIG. 7) such that the KDC 815 can distribute the keys or the IVs among the IP cores, and cause the keys or the IVs to be stored in one or more registers. Using the KDC 815 as part of the disclosed architecture also provides the flexibility to refresh the parameters depending on the application. For example, if the number of bits allocated for the sequence number in a different packet format is small, the sequence number will be re-initialized more often. In such a setup, using a different IV can be mandatory to make sure the counter string in CM is a nonce.

Authentication Scheme. The authentication scheme 809 can use the hash-based Message Authentication Code (HMAC) as described by M. Bellare et al. Additional details are provided in "Keying hash functions for message authentication" (in Advances in Cryptology—CRYPTO '96, pp. 1-15, Springer, 1996), which is hereby incorporated by reference in its entirety. The HMAC equation is shown in Equation 1, where $K_H$ represents the key for HMAC, M represents the message to be authenticated, and $\mathcal{H}$ denotes the chosen hash function. Commonly used hash functions for HMAC include SHA-256 and MD5, composing the names HMAC-SHA-256 and HMAC-MD5, respectively. Depending on the performance goal and security requirement of the application, various hash functions can be selected.

$$\text{HMAC}(K,M) = \mathcal{H}(K_H \oplus \text{opad} || \mathcal{H}(K_H \oplus \text{ipad} || M)) \quad (1)$$

As defined by B. M. Krawczyk, H. and R. Canetti in "HMAC: Keyed-Hashing for Message Authentication" (RFC 2104), the ipad and opad are 0x36 and 0x5C repeating for the number of blocks times. The privacy of the authentication scheme 809 can rely on the security of the key and the hash function (HASHF) used for authentication. Since the resource-constrained nature of the NoC encourages the hash function to be lightweight and easy to implement in hardware, the disclosed approach can make the authentication key secure in the tag calculation. The key for HMAC ($K_H$) is computed by the hash of 256-bit encryption key (K). The size of $K_H$, ipad and opad can each be 32 bits. Major steps of the generateAuthTag procedure are shown in the algorithm of FIG. 9D. As shown, IV can be reused to increase the unpredictability of the tag ($T_i$), and the message to be authenticated (M) is constructed by concatenating the header ($H_i$) and payload ($P_i$).

The receiver can verify the integrity of the message by calculating the tag again using the fields and checking if it matches with the tag ($T_i$) in the received packet. If they do not match, the packet has been tampered with during the NoC traversal. Since the authentication scheme 809 can use the plaintext to generate the tag, it can parallelize the computation of the tag with decryption improving the overall performance.

Experimental Results

Results of evaluation are presented to show the performance gain achieved through the disclosed approach. The security of the disclosed framework, and the area overhead associated with the disclosed approach, are also discussed.

Experimental Setup. The disclosed framework was validated using five benchmarks chosen from the SPLASH-2 benchmark suite on the gem5 full-system simulator. Traffic traces were generated by the cycle-accurate full-system simulator—gem5 described by N. Binkert et al. in "The gem5 simulator." The 4×4 Mesh NoC was built on top of the "GARNET2.0" model that is integrated with gem5 described by N. Agarwal et al. in "Garnet: A detailed on-chip network model inside a full-system simulator." The network interface (NI) was modified to simulate the disclosed security framework. The following options were selected to simulate architectural choices in a resource-constrained NoC.

Packet Format: For the formats of the control packet 403 (FIG. 4A) and the data packet 406 (FIG. 4B), the disclosed approach can use the default GARNET2.0 implementations which allocates 128 bits for a flit. This value results in control messages fitting in 1 flit, and data packets in 5 flits. Out of the 128 bits, 64 bits are allocated for the payload (address) in a control packet 403 and the data packets 406 have a payload of 576 bits (64-bit address and 512-bit data). This motivated the use of 16-bit blocks to evaluate the performance of the disclosed incremental encryption scheme.

Block cipher: The disclosed approach can use an ultra-lightweight block cipher—Hummingbird-2 as the block cipher of the disclosed encryption scheme. Hummingbird-2 is described by D. Engels et al., in "The Hummingbird-2 Lightweight Authenticated Encryption Algorithm." Hummingbird-2 was chosen for experiments mainly because it is lightweight and also, with the block size being 16, other encryption schemes can be broken using brute-force attacks in such small block sizes. However, it has been shown by D. Engels et al. in "The Hummingbird-2 Lightweight Authenticated Encryption Algorithm" that Hummingbird-2 is resilient against attacks that try to recover the plaintext from ciphertext. Hummingbird-2 can use a 128-bit key (e.g., secret key), an 128-bit internal state, and a 64-bit initialization vector for initializing the 128-bit internal state, which provides adequate security for on-chip communication. Considering the payload and block sizes, the disclosed approach can use four block ciphers in counter mode for the disclosed encryption scheme. Each block cipher is assumed to take 20 cycles to encrypt a 16-bit block and each comparison of two-bit strings incurs a 1-cycle delay, as described by D. Engels et al. in "The Hummingbird-2 Lightweight Authenticated Encryption Algorithm." The disclosed framework is flexible to accommodate different packet formats, packet sizes and block ciphers depending on the design requirements. For example, if a certain architecture requires 128-bit blocks, AES can be used while keeping the disclosed incremental encryption approach intact.

Figure 10:
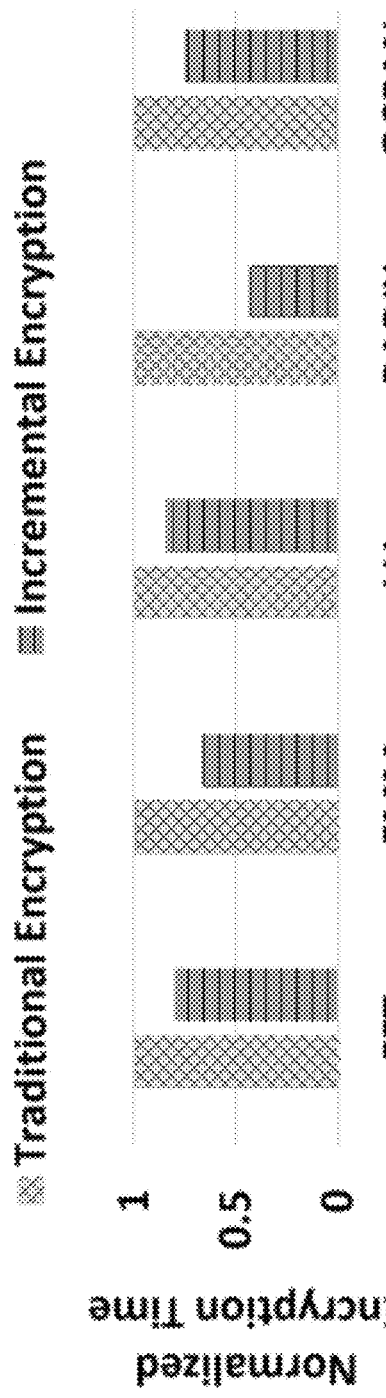
FIG. 10 illustrates a comparison of encryption times using traditional encryption and incremental encryption, in accordance with various embodiments of the present disclosure.
Figure 11:
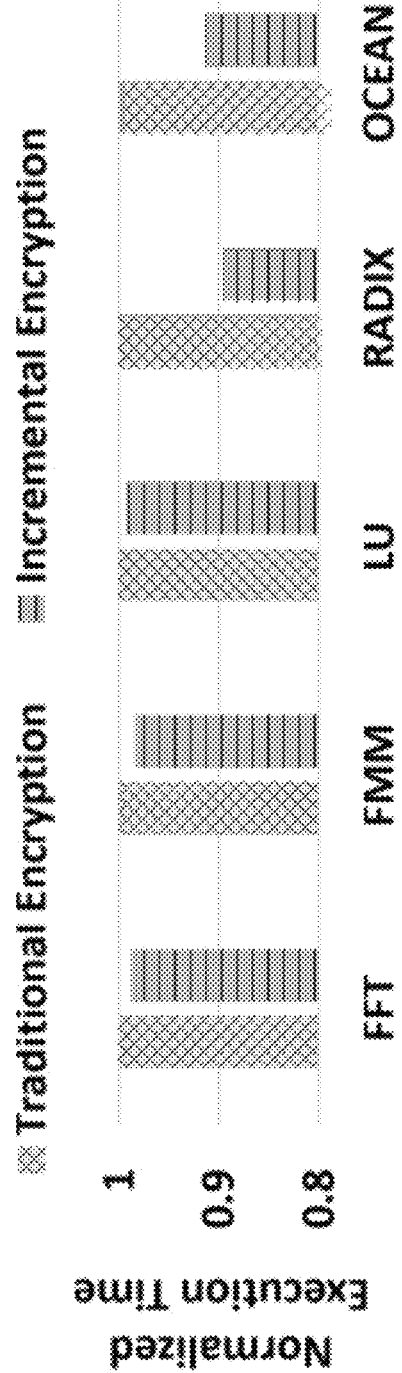
FIG. 11 illustrates a comparison of execution times using traditional encryption and incremental encryption, in accordance with various embodiments of the present disclosure.

Performance Evaluation. The following presents performance improvement achieved by the disclosed approach in two steps: (i) time taken for encryption (FIG. 10) and (ii) execution time (FIG. 11). Experiments measured cycles spent for encryption alone (encryption time) and total cycles executed to run the benchmark (execution time) including encryption time, using the disclosed approach as well as traditional encryption. FIG. 10 shows the encryption time comparison. The disclosed approach improves the performance of encryption by 57% (30% on average) compared to the traditional encryption schemes. The locality in data and the differences in operand values affect the number of changed blocks between consecutive packets. This is reflected in the encryption time. For example, if an application is doing an image processing operation on an image stored in memory, accessing pixel data stored in consecutive memory locations provides an opportunity for performance gain using the disclosed approach.

Experiments also compared the total execution time using traditional encryption as well as incremental encryption. FIG. 11 presents these results. When the overall system including CPU cycles, memory load/store delays and delays traversing the NoC is considered, the total execution time improves up to 10% (5% on average). Benchmarks that have significant NoC traversals such as RADIX and OCEAN show higher performance improvement (10%).

Security Analysis. When discussing the security of the disclosed approach, three main components are considered: (i) incremental encryption, (ii) encryption scheme that uses counter mode, and (iii) block cipher.

Incremental encryption: Due to the characteristics of incremental encryption, the disclosed approach reveals the amount of differences between consecutive packets. Studies on incremental encryption have shown that even though hiding the amount of differences is not possible, it is possible to hide "everything else" by using secure block ciphers and secure operation modes. Attacks on incremental encryption using this vulnerability relies on the adversary having many capabilities in addition to the ones defined in the threat model. When using incremental encryption to encrypt files or documents undergoing frequent, small modifications as explained above, it is reasonable to assume that the adversary not only has availability to the previously encrypted versions of documents but is also able to modify documents and obtain encrypted versions of the modified ones. This attack model allows the adversary to launch chosen plaintext attacks. Discussing security of the disclosed approach for known plaintext, chosen plaintext and chosen ciphertext attacks are irrelevant in the disclosed design since the adversary does not have access to an oracle that implements the design, nor access to known plaintext/ciphertext pairs. In an embodiment where the block cipher and operation mode is secure, incremental encryption doesn't allow or can prevent recovering of plaintext from the ciphertext.

Counter mode encryption: Using the disclosed approach, each block can be treated independently while encrypting, and blocks belonging to multiple packets can be encrypted in parallel. In such a setup, using the same $IV\|\{q\}_d$ string with the same key K can cause the "two time pad" situation. This can be solved by setting the string to $IV\|seq_j\|q$ as shown in the algorithm of FIG. 9B. It gives per message and per block variability and ensures that the value is a nonce. The usage of CM adheres to the security recommendations outlined by D. A. McGrew in "Counter mode security: Analysis and recommendations."

Block cipher: As discussed above, the security of the disclosed framework can depend on the security of the block cipher. The security of the block cipher used in the disclosed framework, Hummingbird-2, has been discussed extensively in "The Hummingbird-2 Lightweight Authenticated Encryption Algorithm" by D. Engels et al. The first version of the Hummingbird scheme was shown to be insecure and Hummingbird-2 was developed to address the security flaws. After thousands of hours of cryptanalysis, no significant flaws or sub-exhaustive attacks against Hummingbird-2 have been found. The Hummingbird-2 approach has been shown to be resilient against birthday attacks on the initialization, differential cryptanalysis, linear cryptanalysis and algebraic attacks. A brute Zhang et al. presented a related-key chosen-IV attack against Hummingbird-2 that recovered the 128-bit secret key. However, the attack requires $2^{28}$ pairs of plaintext to recover the first 4 bits of the key adding up to a data complexity $O(2^{32.6})$. As discussed before, launching such chosen plaintext attacks may not be possible in the NoC setting. A brute force key recover takes $2^{128}$ attempts which is not computationally feasible according to modern computing standards as well as for computing power in the foreseeable future.

The disclosed approach allows easy inclusion of security primitives. Any block size/key size/block cipher can be combined with the disclosed incremental encryption approach. Note that stronger security can come at the expense of performance. Therefore, security parameters can be decided depending on security and performance requirements.

Overhead Analysis. In experiments, the disclosed incremental encryption approach was implemented using Verilog to show the area overhead in comparison with the original Hummingbird-2 implementation. The disclosed implementation is capable of assigning blocks to idle block ciphers and encrypting up to four payloads in parallel. Merger and scheduler units were implemented to ensure the correctness of final encrypted/decrypted payloads. Experiments were conducted using the Synopsys Design Compiler with 90 nm Synopsis library (saed90 nm). Based on results, the disclosed approach introduces less than 2% overall area overhead with respect to the entire NoC. When only the encryption unit is considered, the overhead is 15%. This overhead is caused due to components responsible for buffering and scheduling of modified blocks to idle block cipher units as well as computations related to the construction of the final result. Therefore, the disclosed encryption approach has a negligible area overhead and it can be efficiently implemented as a lightweight security mechanism for NoCs. While there is a minor increase in power overhead due to the additional components, there is no penalty on overall energy consumption due to the reduction in execution time.

A lightweight security mechanism has been presented that improves the performance of traditional encryption schemes used in NoC while incurring negligible area and power overhead. The disclosed approach provides a NI 803 (FIG. 7) that can use incremental encryption to achieve performance improvement by utilizing the unique traffic characteristics of packets observed in an NoC. The security framework comprises an encryption/decryption scheme 806 that provides secure communication on the NoC. Examples of an authentication scheme 809 are also provided. The disclosed framework was validated in terms of security to prove that the performance gain is not achieved at the expense of security. Experimental results show a performance improvement of up to 57% (30% on average) in encryption time and up to 10% (5% on average) in total execution time compared to traditional encryption while introducing less than 2% overall area overhead. Additional details are provided in the conference paper entitled "Securing Network-on-Chip using Incremental Cryptography" (IEEE Computer Society Annual Symposium on VLSI (ISVLSI), Limassol, Cyprus, Jul. 6-8, 2020), available at https://esl.cise.ufl.edu/A/Publications/isvlsi20incremental.pdf, which is hereby incorporated by reference in its entirety.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The term "substantially" is meant to permit deviations from the descriptive term that don't negatively impact the intended purpose. Descriptive terms are implicitly understood to be modified by the word substantially, even if the term is not explicitly modified by the word substantially.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about y".

The invention claimed is:

1. A method for incremental encryption of intellectual property (IP) core communications, comprising:
   obtaining, by a network interface (NI) of a sender intellectual property (IP) core in a network-on-chip (NoC) based system-on-chip (SoC) architecture, a payload for communication to a receiver intellectual property (IP) core;
   identifying, by the NI, one or more different blocks between the payload and a payload of a previous packet communicated between the sender IP core and the receiver IP core, each different block of the one or more different blocks comprising bitwise differences between a block of the payload and a corresponding block of the payload of the previous packet;
   encrypting, by the NI, the one or more different blocks to create encrypted blocks of an encrypted payload; and
   constructing, by the NI, a ciphertext from the encrypted blocks and the one or more different blocks to create the encrypted payload.

2. The method of claim 1, further comprising:
   generating, by the NI, helper data that indicates the one or more different blocks.

3. The method of claim 2, further comprising:
   generating a final packet for communication to the receiver IP core by combining at least the helper data and the encrypted payload.

4. The method of claim 3, further comprising:
   adding at least one filler to create the final packet.

5. The method of claim 3, wherein the final packet is a same packet size as the previous packet.

6. The method of claim 1, wherein encrypting the one or more different blocks to create encrypted blocks comprises:
   splitting the payload into the one or more different blocks and encrypting the one or more different blocks.

7. The method of claim 1, wherein the previous packet comprises a most recent one of a plurality of packets communicated between the sender IP core and the receiver IP core.

8. A method for decryption of intellectual property (IP) core communications, comprising:
   identifying, by a network interface (NI) of a receiver intellectual property (IP) core in a network-on-chip (NoC) based system-on-chip (SoC) architecture, a packet comprising an encrypted payload received from a sender intellectual property (IP) core; and
   decrypting, by the NI, the encrypted payload based at least in part on applying at least one parameter to create one or more different blocks corresponding to a payload of a previous packet identified by the receiver IP core communicated between the sender IP core and the receiver IP core, each different block of the one or more different blocks comprising bitwise differences between a block of the payload of the previous packet and a corresponding block of an unencrypted payload associated with the encrypted payload.

9. The method of claim 8, wherein a plaintext header of the packet comprises helper data that indicates at least one location for the one or more different blocks associated with the previous packet.

10. The method of claim 9, further comprising:
    constructing, by the NI, a new payload based at least in part on combining the one or more different blocks with at least a portion of the payload of the previous packet based at least in part on the location.

11. The method of claim 8, wherein the at least one parameter is stored in a register of the NI, and wherein the at least one parameter comprises a key or an initialization vector.

12. The method of claim 8, wherein the packet comprises helper data that indicates at least one location for the one or more different blocks associated with the previous packet.

13. A method for incremental cryptography of intellectual property (IP) core communications in a network-on-chip (NoC) based system-on-chip (SoC) architecture, comprising:

obtaining, by a network interface (NI) of a sender intellectual property (IP) core, a payload for communication to a receiver intellectual property (IP) core;

splitting, by the NI, the payload into one or more different blocks, each different block of the one or more different blocks comprising bitwise differences between a block of the payload and a corresponding block of a payload stored in a register of the NI of the sender IP core, where the payload stored in the register is associated with the receiver IP core;

encrypting, by the NI, individual ones of the one or more different blocks to create encrypted blocks of an encrypted payload; and constructing, by the NI, a ciphertext from the encrypted blocks and the one or more different blocks to create the encrypted payload.

14. The method of claim 13, further comprising:
transmitting the encrypted payload comprising the ciphertext to the receiver IP core.

15. The method of claim 13, wherein encrypting individual ones of the one or more different blocks occurs in parallel.

16. The method of claim 13, further comprising transmitting helper data to the receiver IP core that indicates at least one location for the one or more different blocks.

17. The method of claim 13, wherein encrypting individual ones of the one or more different blocks comprises storing or retrieving an initialization vector or a key.

18. The method of claim 17, wherein the key comprises a 128-bit secret key, and the initialization vector comprises a 64-bit initialization vector for initializing a 128-bit internal state.

* * * * *